(12) United States Patent
Steele et al.

(10) Patent No.: US 9,971,879 B2
(45) Date of Patent: May 15, 2018

(54) SECURE RECORDING AND RENDERING OF ENCRYPTED MULTIMEDIA CONTENT

(71) Applicant: Adobe Systems Incorporated, San Jose, CA (US)

(72) Inventors: Joseph Steele, Danville, CA (US); John Landwehr, Vienna, VA (US)

(73) Assignee: Adobe Systems Incorporated, San Jose, CA (US)

( * ) Notice: Subject to any disclaimer, the term of this patent is extended or adjusted under 35 U.S.C. 154(b) by 196 days.

(21) Appl. No.: 15/165,337

(22) Filed: May 26, 2016

(65) Prior Publication Data

US 2017/0344728 A1 Nov. 30, 2017

(51) Int. Cl.
*G06F 21/10* (2013.01)
*H04L 9/08* (2006.01)

(52) U.S. Cl.
CPC .......... *G06F 21/10* (2013.01); *H04L 9/083* (2013.01); *H04L 9/088* (2013.01); *H04L 9/0866* (2013.01); *G06F 2221/0753* (2013.01); *G06F 2221/0755* (2013.01)

(58) Field of Classification Search
None
See application file for complete search history.

(56) References Cited

U.S. PATENT DOCUMENTS

| | | | |
|---|---|---|---|
| 5,862,217 A | 1/1999 | Steinberg et al. | |
| 6,550,009 B1 * | 4/2003 | Uranaka | G11B 20/00086 380/229 |
| 6,912,512 B2 * | 6/2005 | Miyazaki | G06F 21/10 705/51 |
| 7,343,495 B2 * | 3/2008 | Kambayashi | G06F 21/10 380/201 |
| 7,831,833 B2 * | 11/2010 | Gaylor | G06F 21/31 380/277 |
| 8,001,582 B2 * | 8/2011 | Hulten | H04L 63/102 726/3 |
| 8,295,490 B1 * | 10/2012 | McCoy | H04L 9/0894 380/279 |
| 2003/0084306 A1 * | 5/2003 | Abburi | G06F 21/10 713/188 |
| 2005/0033994 A1 * | 2/2005 | Suzuki | H04L 63/083 726/19 |

(Continued)

*Primary Examiner* — Peter Poltorak
(74) *Attorney, Agent, or Firm* — Finch & Maloney PLLC

(57) ABSTRACT

An authorized user obtains a packaging license that grants permission to use a particular recording device to generate multimedia content in accordance with specified license terms. The packaging license includes a content key that is used to encrypt the multimedia content at the point of capture on the recording device. The encrypted multimedia content can be transmitted via unsecure channels (for example, via electronic mail) to a networked content repository or an intended recipient. For playback, an authorized user obtains a playback license that grants permission to decrypt and playback the multimedia content using a particular playback device. An authorization server and a key management server are used to manage which users are entitled to receive a license, and to define the terms of the granted licenses. A record of the granted authorizations and licenses is maintained, thereby allowing access to a given content item to be audited.

15 Claims, 9 Drawing Sheets

(56) References Cited

U.S. PATENT DOCUMENTS

| | | | | |
|---|---|---|---|---|
| 2006/0085354 | A1* | 4/2006 | Hirai | G06F 21/10 705/59 |
| 2006/0230265 | A1* | 10/2006 | Krishna | H04L 63/0281 713/158 |
| 2007/0009230 | A1* | 1/2007 | Tanaka | G06F 21/10 386/244 |
| 2010/0122088 | A1* | 5/2010 | Oxford | G06F 21/10 713/168 |
| 2012/0216043 | A1* | 8/2012 | Le Cam | G08B 13/19656 713/176 |
| 2015/0326618 | A1* | 11/2015 | Lim | G06F 21/64 726/27 |

* cited by examiner

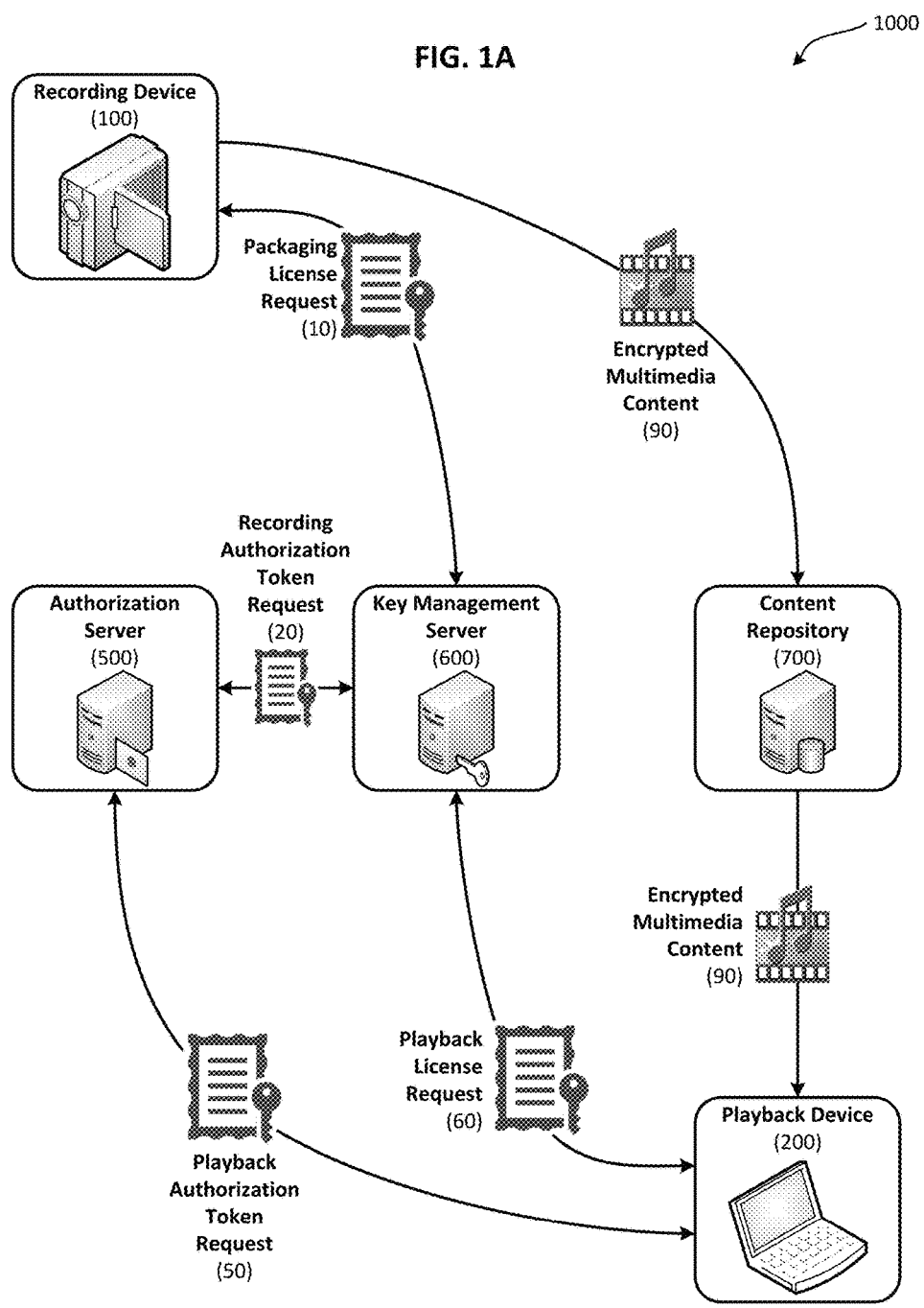

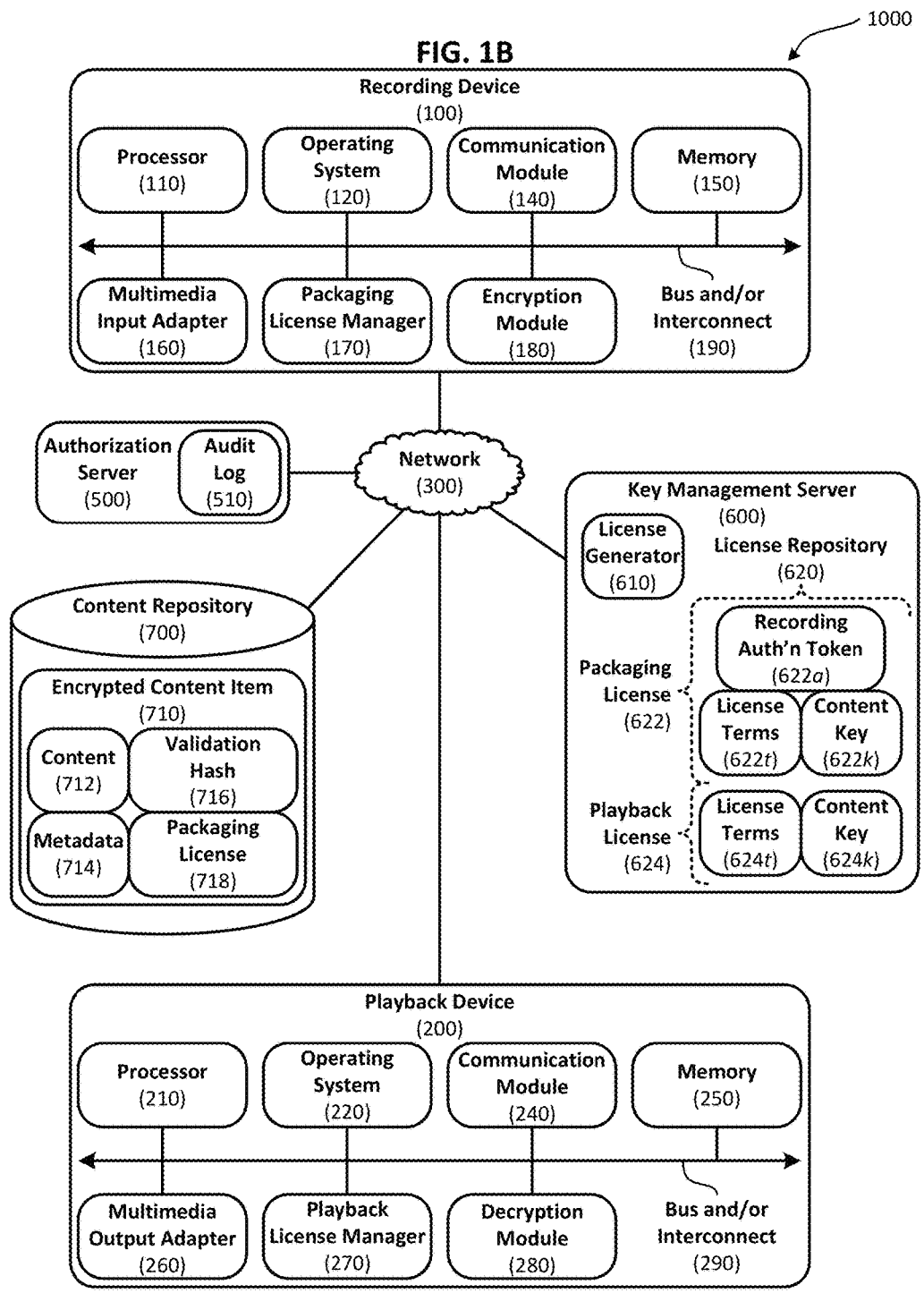

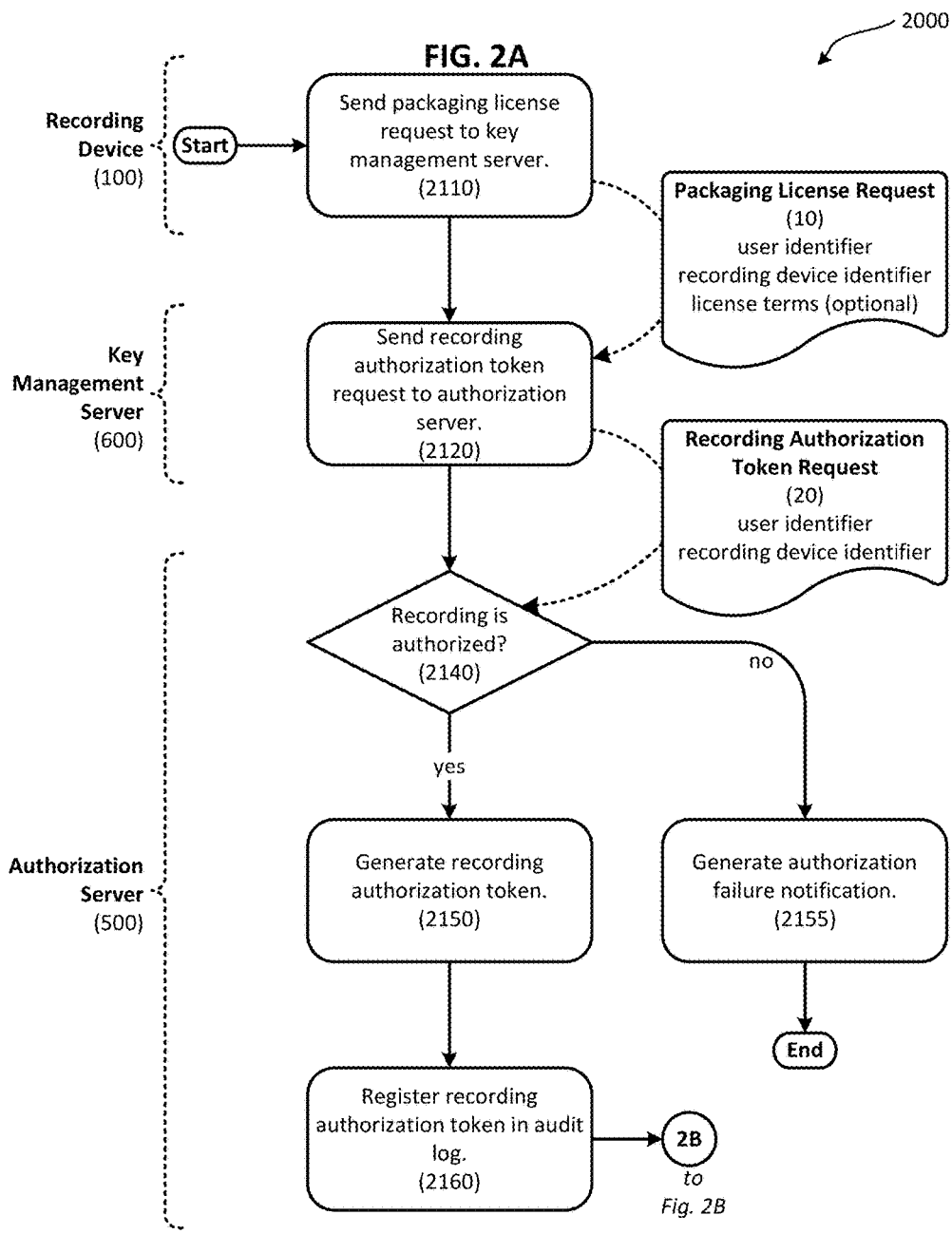

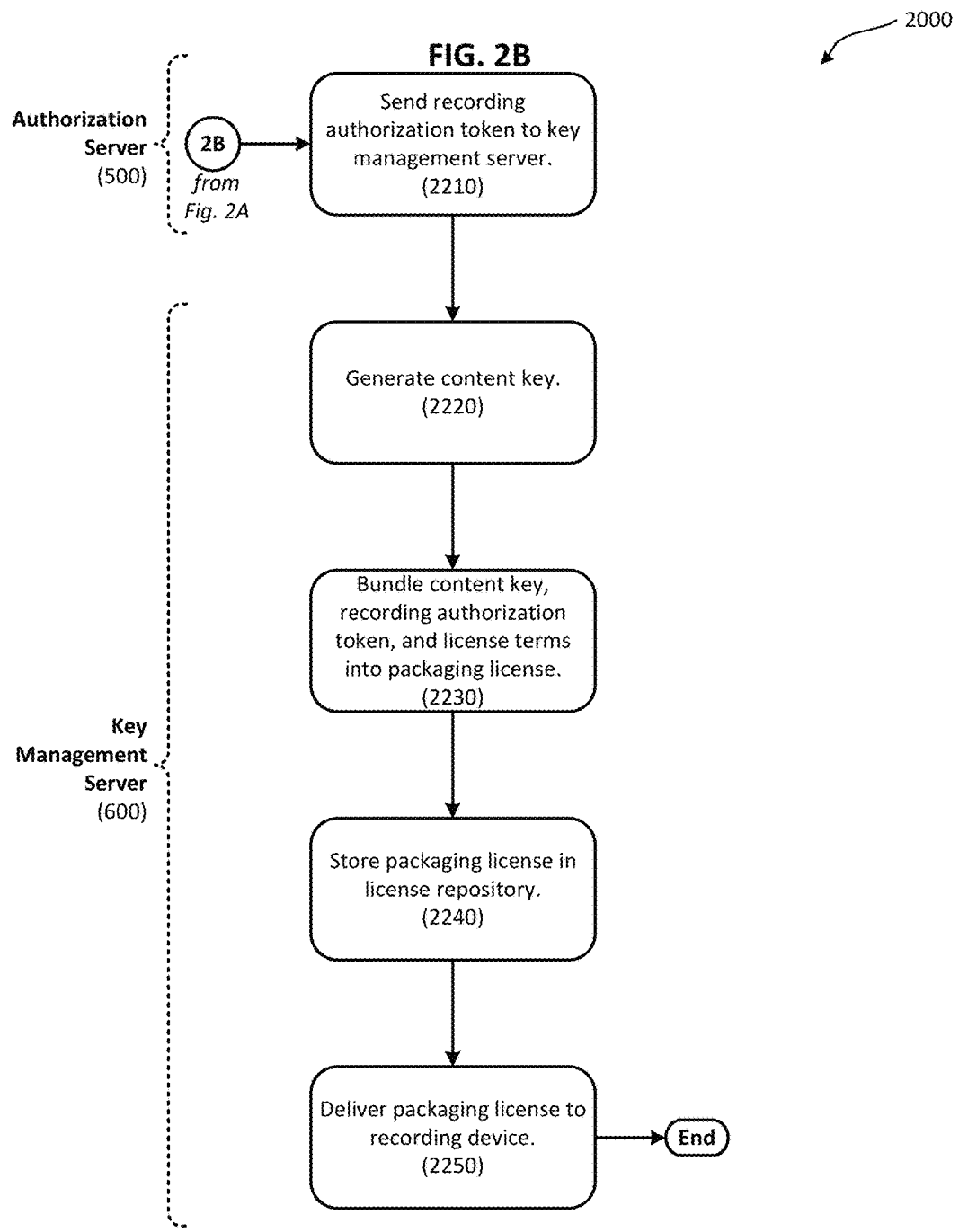

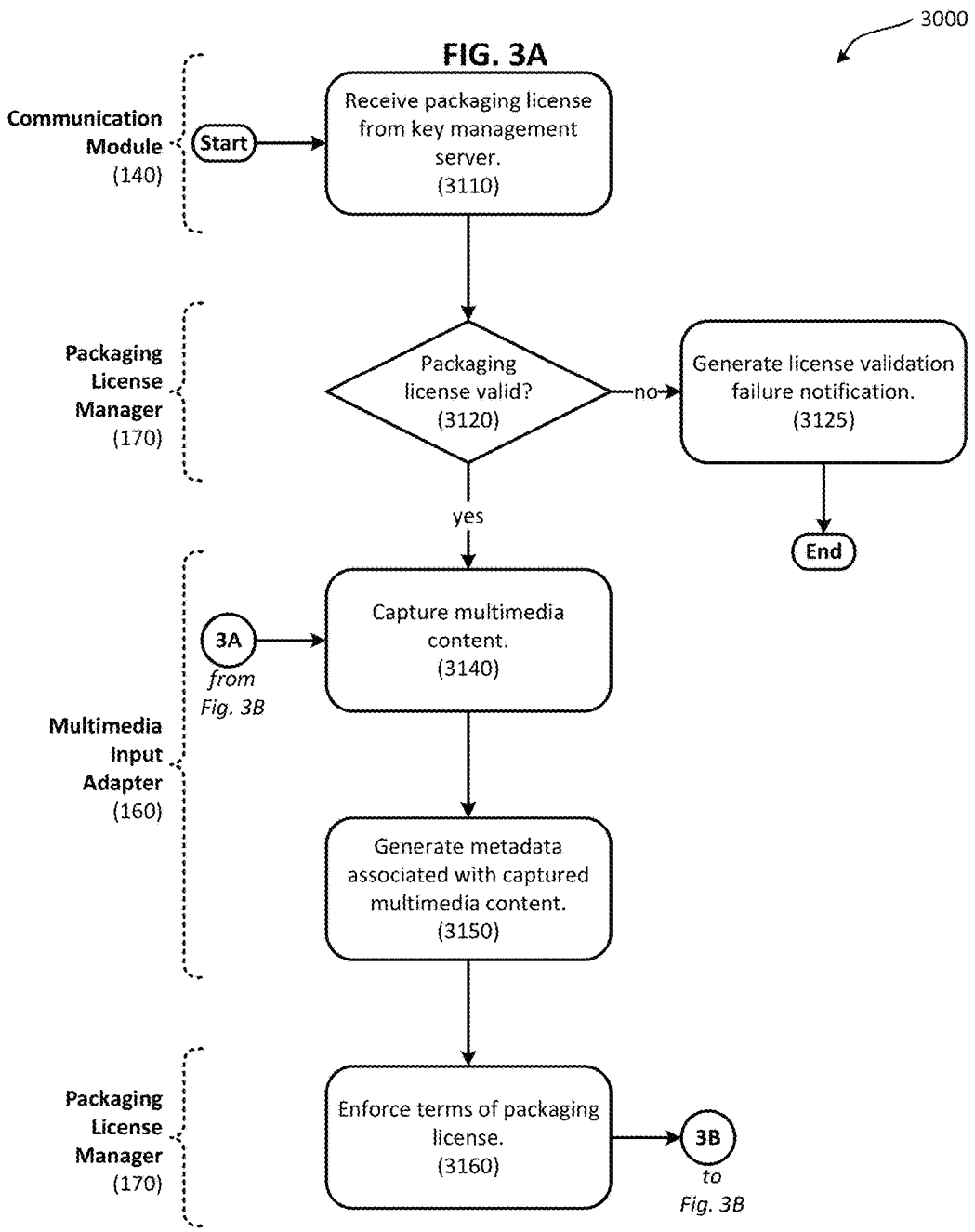

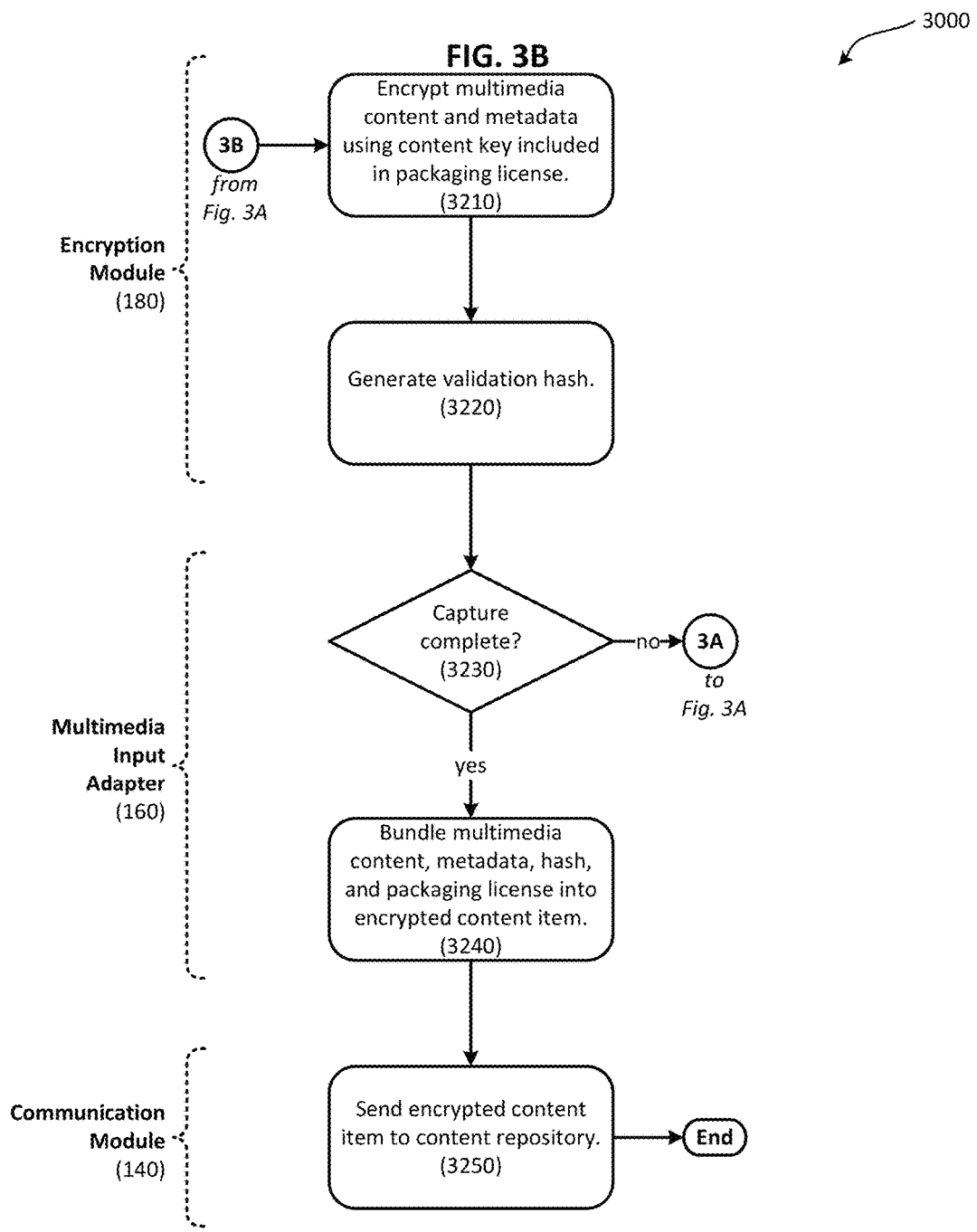

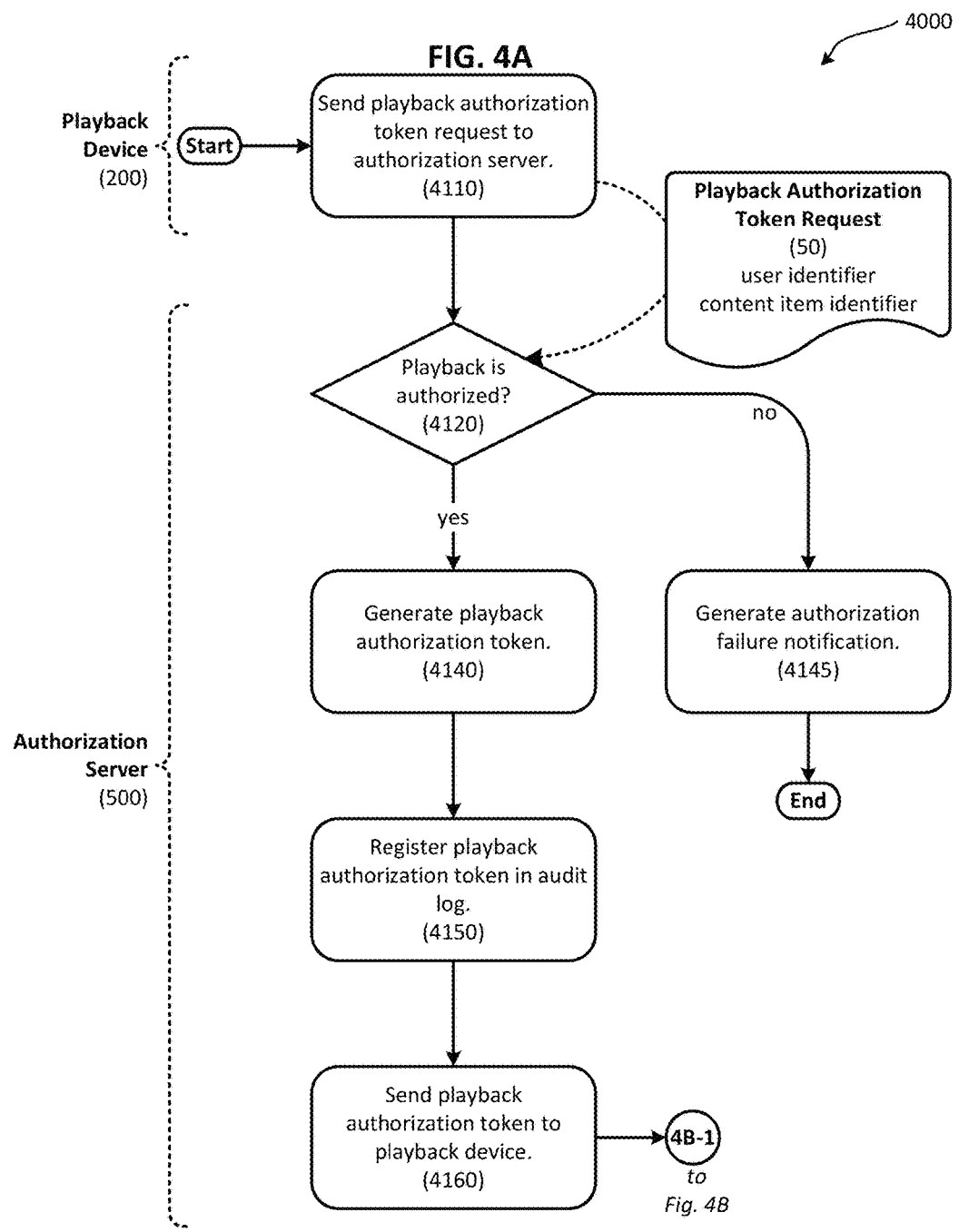

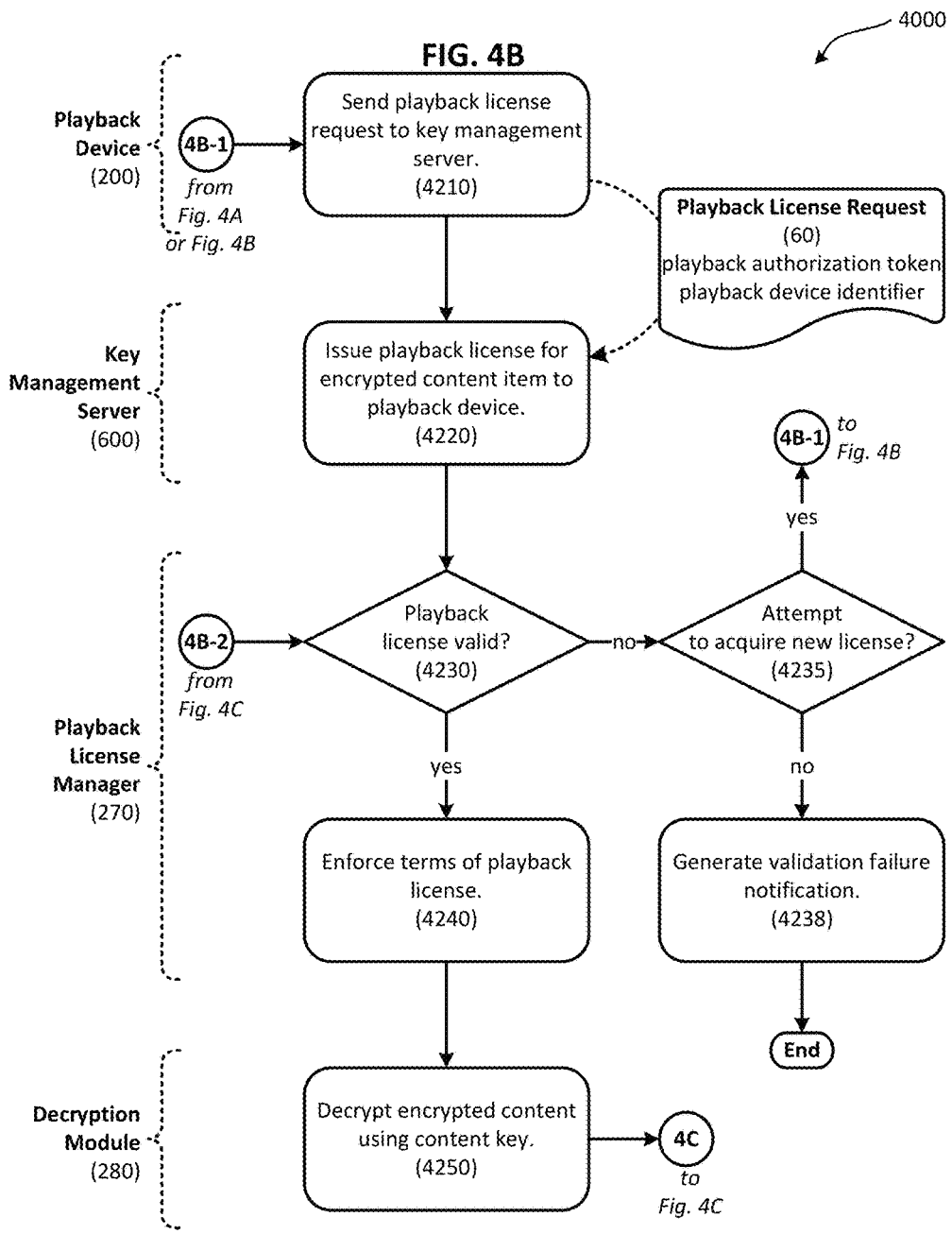

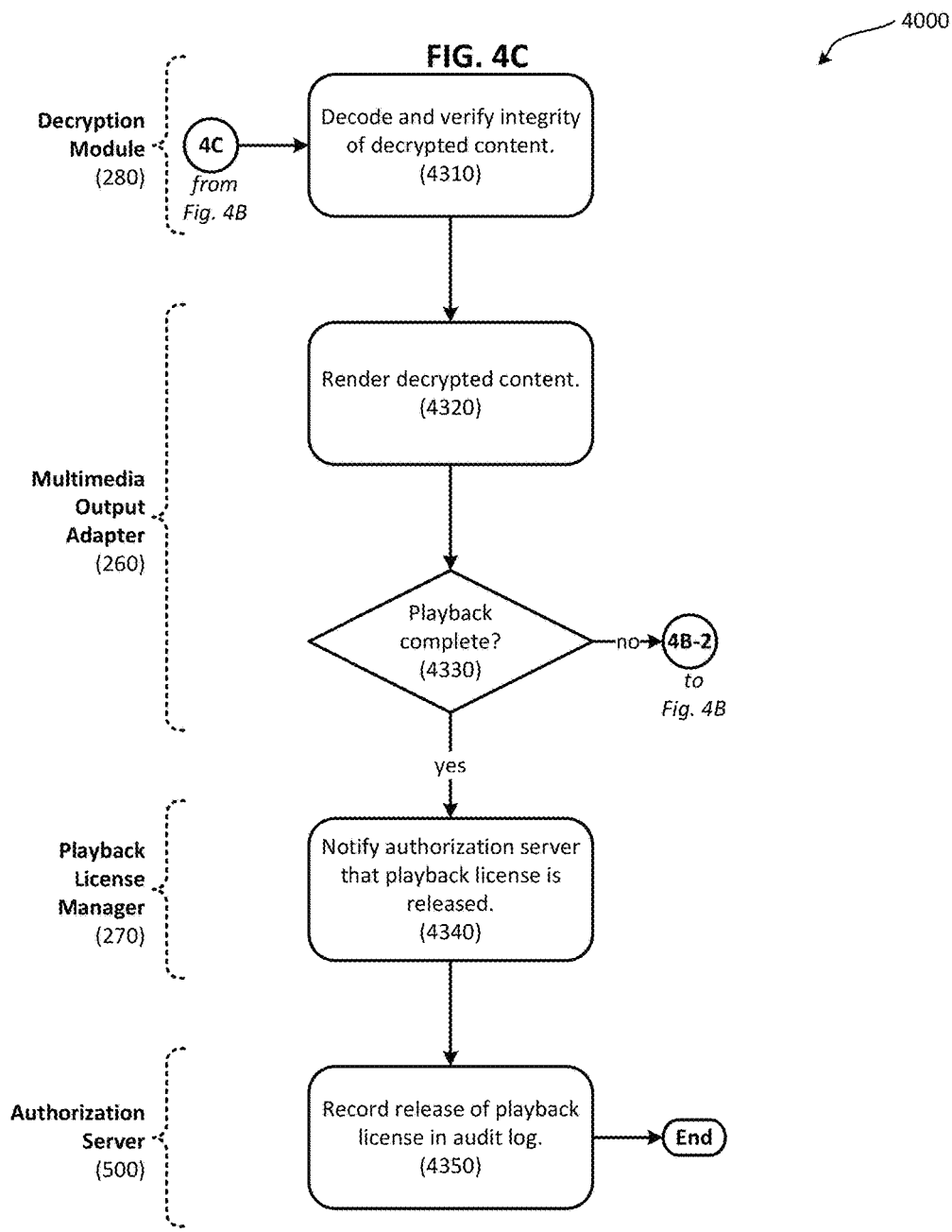

SECURE RECORDING AND RENDERING OF ENCRYPTED MULTIMEDIA CONTENT

FIELD OF THE DISCLOSURE

This disclosure relates generally to encryption techniques for multimedia content, and more specifically to methods for securely recording and rendering encrypted multimedia content.

BACKGROUND

Societies have long recognized the importance of being able to encode information in a way that ensures only authorized parties have access to the encoded information. This recognition has led to the development of cryptographic techniques which have been used to secure sensitive information for centuries. Information security is especially important in modern societies having economies and institutions that place substantial reliance on information that is stored digitally. Indeed, in many cases, entire transactions, relationships, and events are defined by information that is stored only in digital form. Such information includes not only textual documents, financial data, and the like, but also includes multimedia content such as audio, visual, and audiovisual content. In many cases, if digital assets such as these were to be lost or compromised, the financial and human toll would be substantial. In particular, for a digital asset that has no analog equivalent, once all copies of the asset are lost or compromised, the asset is unrecoverable. Applying robust cryptographic techniques to the storage and transmission of digital assets reduces the likelihood of intentional or unintentional data corruption going undetected, and is therefore often considered to be critically important in modern digital societies.

To provide one example, in the field of criminal law prosecutors and defendants alike often rely on audiovisual evidence. For instance, a security camera or body camera may generate a video recording, stored in digital form, that provides evidence of a suspect's guilt or innocence. But the video recording will be largely useless to prosecutors and defendants alike if its contents are subject to manipulation by unauthorized parties. And in many cases the video recording may contain sensitive information that should not be subject to public release, for example to protect a victim's privacy. To date, efforts to secure audiovisual evidence have focused on physically securing the devices and media used to capture and store the evidence, respectively.

BRIEF DESCRIPTION OF THE DRAWINGS

FIG. 1A is a data flow diagram schematically illustrating selected data transmissions that occur in an example framework for securely recording and rendering multimedia content.

FIG. 1B is a block diagram schematically illustrating selected components of an example framework for the secure recording and rendering of multimedia content.

FIGS. 2A and 2B comprise a flowchart illustrating an example method for authorizing a particular recording device to generate an encrypted multimedia content item.

FIGS. 3A and 3B comprise a flowchart illustrating an example method for securely recording an encrypted multimedia content item based on a previously-received authorization.

FIGS. 4A through 4C comprise a flowchart illustrating an example method for secure playback of an encrypted multimedia content item.

DETAILED DESCRIPTION

Given the recognized importance of maintaining the security and integrity of digital assets, significant resources have been devoted to developing digital storage repositories that are resistant to malicious attack and other potentially compromising events. While secure and reliable digital storage repositories are now widely available, it is important to recognize that digital assets should be secured not only in a storage resource, but at other points along a virtual "chain of possession" that extends from creation to consumption. For example, a multimedia content item will ideally be secured from the time it is initially generated at a recording device to the time it is ultimately rendered at a playback device. The fact that the content item is intermediately stored in a highly secure digital repository is of little value if it is easily compromised before being received by the storage repository, or after being extracted from the storage repository. Until now, efforts to address this concern have focused on physically securing the devices used to record and render multimedia content. Physical security requires a substantial infrastructure to maintain a record of access. And even when such an infrastructure is implemented, it is still subject to human error. An entirely digital solution would be less labor intensive, more reliable, and more cost-effective. Perhaps most importantly, a digital solution would provide secure storage for multimedia content from recording to playback.

Based on the foregoing, and in accordance with certain of the embodiments disclosed herein, methods for securely recording and rendering encrypted multimedia content are disclosed. In one embodiment, an authorized user obtains a packaging license that grants permission to use a particular recording device to generate multimedia content in accordance with specified license terms. The packaging license includes a content key that is used to encrypt the multimedia content at the point of capture on the recording device. The encrypted multimedia content, which is optionally digested to facilitate subsequent tamper detection, can be transmitted via unsecure channels (for example, via electronic mail) to a networked content repository or an intended recipient. To render the content, an authorized user obtains a playback license that grants permission to decrypt and render the multimedia content using a particular playback device. An authorization server and a key management server are used to manage which users are entitled to receive a license, and to define the terms of the granted licenses. A record of the granted authorizations and licenses is maintained, thereby allowing access to a given content item to be audited. The result is a secure recording and playback framework for encrypted multimedia content. A wide range of alternative embodiments will be apparent in light of this disclosure.

A secure multimedia recording and playback framework, such as the one disclosed herein, has a wide range of applications, although it is particularly useful in the law enforcement context. Law enforcement increasingly relies on multimedia content as evidence in criminal proceedings. Criminal defendants may also rely on such content as exculpatory evidence. Examples of multimedia content include video recordings, audio recordings, and audiovisual recordings, all of which are often stored in digital form. The integrity of a criminal proceeding depends on establishing that a proffered recording accurately represents that which is purported to have been recorded, and therefore it is important to strictly monitor and control access to the proffered recording. Controlling access to a recording also helps to protect the privacy of victims or other unrelated individuals who may appear in the recording. Indeed, one frequently raised objection to the use of closed-circuit television cameras, body cameras, and other recording devices in public places is the danger of unauthorized parties gaining access to the recorded multimedia content generated by such devices.

One way to address such concerns is to implement a security framework that encrypts and decrypts multimedia content at the recording and playback devices, respectively. In addition to reducing the likelihood that unauthorized parties will be able to access and tamper with recorded content, this also reduces the need to physically secure and control access to recording devices, playback devices, and the media used to store recorded content. For example, if a video camera generates unencrypted content, that content is subject to being copied or intercepted any time before it is deposited in a secure storage repository. Such interception may occur, for example, when a third party intercepts electronic transmission of the content, or when an unscrupulous clerk copies the content before securing it. On the other hand, if the content is encrypted immediately upon generation at the recording device itself, such interception is far less likely, or even impossible. A security framework that provides encryption or decryption at the recording or playback device itself, respectively, can be implemented in accordance with certain of the embodiments disclosed herein.

Moreover, because such a security framework can be governed by user authorizations, recording licenses, and playback licenses that are issued from a central licensing authority (such as the authorization server and/or the key management server disclosed herein), this makes it easier to implement uniform access policies that define the conditions under which multimedia content can be recorded and rendered. For example, in the aforementioned law enforcement context, a central licensing authority can determine and uniformly implement licensing policies that allow authorized personnel, such as officers, attorneys, and judicial staff to access encrypted content items. Such licensing policies can also be used to control how long recorded content is retained, thus helping to ensure that, after a certain point, no usable copies of the content exist. In addition, because content playback invokes both user authorization and content decryption services, certain implementations of the framework disclosed herein also ensure that only authorized playback devices are able to view decrypted content. Adding a validation hash and a digital signature during the encryption process facilitates tamper detection at any point after the initial encryption.

As used herein, the term "token" refers, in addition to its ordinary meaning, to data that can be used to identify and/or authenticate a trusted client. A token can therefore be understood as identifying a privilege associated with the bearer of the token. For example, in certain embodiments an authorization token establishes that a particular user is authorized to use a designated recording device or access an identified multimedia content item. Tokens often consist of a randomly generated alphanumeric string of characters that would be difficult to guess using brute force methods. The authenticity of a token generated in this manner can be verified based on a secret, such as a password or other key, thus eliminating any need to store the actual token in a repository. In such embodiments a client can authenticate itself to a server simply by providing the token to the server, for instance as part of a license request submitted to a key management server. A token can optionally be configured to expire after a specified period of time, or after a certain event has occurred.

As used herein, the term "multimedia content" refers, in addition to its ordinary meaning, to audio, visual, or audio-visual information intended for consumption by a user, organization, or other human- or computer-controlled entity. In general, multimedia content can be understood as including audible recordings played via speakers or headphones, visual presentations that include one or more visual assets which may or may not change with the progression of time, and combinations of both audible and visual assets. Specific examples of multimedia content include television programs, movies, animated sequences, closed-circuit television recordings, surveillance recordings, and other audiovisual assets. In applications where multimedia content includes both audio and video components, such components can be separated and subjected to different processing techniques. Multimedia content can be stored in a compressed digital format and may be created and manipulated using any suitable editing application. For example, multimedia content can be stored in any suitable file format defined by the Moving Picture Experts Group (MPEG) (including MPEG-4), can be stored as a sequence of frames defined in a color space such as red-green-blue (RGB) or luma-chrominance (YUV), or can be stored in any other suitable compressed or uncompressed file format, including file formats generated in real-time by animation engines, compositing engines, or other video recording applications. Multimedia content may also include information that is not specifically intended for display, and thus also encompasses items such as embedded executable instructions, scripts, hyperlinks, metadata, encoding information, audio tracks, validation hashes, licensing information, and formatting information. The term "multimedia content item" refers to a collection of multimedia content that is organized into a distinct unit, such as a file, which can be subjected to various processing operations, as disclosed herein. Multimedia content items may also be referred to as "multimedia assets". The terms "digital content" and "digital assets" refer to content which is encoded in binary digits (for example, zeroes and ones). Thus, in the context of applications involving digital computers, the terms "content", "digital content", "assets" and "digital assets" are often used interchangeably. The modifier "multimedia" can be appended to any of these terms. Content "rendering" and content "playback" are considered to be equivalent operations, and thus these terms are used interchangeably.

System Architecture

FIG. 1A is a data flow diagram schematically illustrating selected data transmissions that occur in an example framework 1000 for securely recording and rendering multimedia content. FIG. 1B is a block diagram schematically illustrating further details of the components of framework 1000. Encrypted multimedia content 90 can be recorded using a recording device 100, stored at a networked content repository 700, and rendered using a playback device 200. An authorization server 500 manages user and device authorizations with respect to the recording and playback operations. Granted authorizations are recorded in an audit log 510, thus facilitating the subsequent generation of an audit record indicating those individuals who have been granted access to a particular content item, or who have been granted authorization to use recording device 100 or playback device 200. A key management server 600 grants and maintains packaging and playback licenses that specify how recording device 100 or playback device 200, respectively, is to be used. Such licenses include a key that can be used to encrypt or decrypt encrypted multimedia content 90. Recording device 100, playback device 200, authorization server 500, key management server 600, and content repository 700 can communicate with each other, as well as with other networked computing devices and resources, via a network 300. While a single network connection may exist between these components in certain embodiments, on other embodiments separate networks and network connections can be used to transmit encrypted multimedia content 90 between recording device 100 and content repository 700, and between content repository 700 and playback device 200. Likewise, still other networks and network connections can be used to transmit the various recording and playback licenses, license requests, and other authorizations. Other components and functionality not reflected in FIGS. 1A and 1B will be apparent in light of this disclosure, and thus it will be appreciated that other embodiments are not limited to any particular hardware configuration.

Recording device 100 is an electronic device that is capable of generating multimedia content such as an audio recording, a video recording, or an audiovisual recording. Examples of recording device 100 include a digital camera; a closed circuit television camera; a surveillance camera; a portable camera mounted on a dashboard, helmet, unmanned aerial vehicle, uniform, or other location; an audio recording device; a smartphone; a tablet computer; a laptop computer; a dictation device, or any other electronic device or combination of devices capable of visually and/or aurally recording an observed scene. Likewise, playback device 200 is an electronic device that is capable of rendering multimedia content that is generated by recording device 100. Thus, depending on the particular type of multimedia content which is to be rendered, playback device 200 may include a speaker, a display screen, or both. Examples of playback device 200 include a smartphone, a tablet computer, a laptop computer, a desktop computer, a networked television set, a set-top box, a workstation, a headset, a portable speaker, or any other electronic device or combination of devices capable of rendering recorded multimedia content. In many cases, a device which functions as recording device 100 may also function as playback device 200. One example of such a multipurpose device is a smartphone. In general, the various embodiments disclosed herein can be implemented in conjunction with a wide range of existing or subsequently developed hardware capable of capturing and rendering multimedia content.

Recording device 100 and playback device 200 each include one or more software modules configured to implement the various functionalities disclosed herein, as well as hardware that enables such implementation. Examples of enabling hardware include a processor 110, 210; a communication module 140, 150; a memory 150, 250; and a bus and/or interconnect 190, 290. Recording device 100 includes hardware capable of audio or video recording, such as a microphone or an array of semiconductor charge-coupled devices. Recording device 100 also optionally includes hardware that facilitates biometric identification of a user, such as a fingerprint sensor. Biometric identification can also be provided by components of recording device 100 which are also used to record multimedia content, such as a camera (for facial recognition or iris recognition) or a microphone (for voiceprint recognition). Playback device 200 includes hardware capable of rendering multimedia content generated by recording device 200, such as a speaker or a liquid crystal display device. Examples of implementing software include an operating system 120, 220, a multimedia input adapter 160, a multimedia output adapter 260, a packaging license manager 170, a playback license manager 270, an encryption module 180, and a decryption module 280.

Processor 110, 210 is any suitable processor, and may include one or more coprocessors or controllers, such as an audio processor or a graphics processing unit, to assist in control and processing operations associated with recording device 100 and playback device 200. Communication module 140, 240 is any appropriate network chip or chipset which allows for wired and/or wireless connection to network 300 and other computing devices and resources, such as authorization server 500, key management server 600, and content repository 700. Communication module 140, 240 is also configured to provide intra-device communications via bus and/or interconnect 190, 290. Memory 150, 250 is implemented using any suitable type of digital storage, such as one or more of a disc drive, a redundant array of independent disks, a universal serial bus drive, flash memory, random access memory, or any suitable combination of the foregoing. Thus in certain embodiments memory 150, 250 comprises a distributed system of multiple digital storage devices one or more of which may be remotely located.

Operating system 120, 220 may comprise any suitable operating system, such as Google Android (Google Inc., Mountain View, Calif.), Microsoft Windows (Microsoft Corp., Redmond, Wash.), or Apple OS X (Apple Inc., Cupertino, Calif.). As will be appreciated in light of this disclosure, the techniques provided herein can be implemented without regard to the particular operating system provided in conjunction with recording device 100 and playback device 200, and therefore may also be implemented using any suitable existing or subsequently developed platform. Multimedia input adapter 160 and multimedia output adapter 260 are configured to interface with input and output devices, respectively, and thereby facilitate the respective recording and playback of multimedia content. For example, in one embodiment multimedia input adapter 160 is configured to interface with a digital camera, and thus receive audiovisual input generated by such camera. Likewise, in one embodiment multimedia output adapter 260 is configured to interface with a tablet computer, and thus cause multimedia content to be rendered—both visually and aurally—using such device.

Still referring to the example embodiment illustrated in FIGS. 1A and 1B, packaging license manager 170 and playback license manager 270 are configured to evaluate, extract components from, and respond to terms presented in a license received at recording device 100 or playback device 200, respectively. To this end, packaging license manager 170 and playback license manager 270 comprise instructions that, when executed by a processor, implement the various functionalities disclosed herein. For example, in one embodiment licensing manager 170, 270 evaluates a received license to determine the license validity, and extracts a content key from the received license. In the case of packaging license manager 170, the content key is used to encrypt recorded content, while in the case of playback license manager 270, the content key is used to decrypt content that is to be rendered. In some cases a received license may include terms that govern certain aspects of the content recording or playback operation, such as temporal or geographical restrictions. License manager 170, 270 is configured to enforce any such restrictions.

Encryption module 180 and decryption module 280 are configured to encrypt and decrypt, respectively, multimedia content. To this end, encryption module 180 and decryption module 280 comprise instructions that, when executed by a processor, implement the various functionalities disclosed herein. For example, in one embodiment encryption module 180 encrypts content as it is captured by recording device 100 using a key that is specific to the user and/or recording device 100. Likewise, decryption module 280 decrypts content that is received by playback device 200 using a key that is specific to the user and/or playback device 200. Encryption module 180 optionally adds a digital signature to the content during the encryption process. A digest of the captured content is optionally encrypted as well, thus facilitating tamper detection and allowing the integrity of the encrypted content to be verified later. Thus, in certain embodiments decryption module 280 is configured to extract and verify a digital signature and/or a digest during the decryption process.

Any of a variety of suitable encryption techniques can be used in conjunction with the techniques disclosed herein. For example, in one embodiment encryption is performed according to the advanced encryption standard (AES) operating in counter (CTR) mode with a 128-bit encryption key. In another embodiment encryption is performed according to the AES operating in Galois/Counter Mode (GCM) or a combination of AES-CTR and AES with a message authentication code (MAC). In certain implementations the encryption is authenticated, thus providing confidentiality, integrity, and authenticity assurances on the encrypted content. This also allows decryption module 280 to provide decryption and integrity verification in a single operation. In such implementations a separate key, such as a digital signature, is used to provide authentication, in which case the packaging or playback license will include two separate keys. It will be appreciated that this disclosure is not limited to the particular encryption techniques disclosed herein, and that other embodiments may invoke other existing or subsequently developed encryption techniques.

As noted above, and as illustrated in FIGS. 1A and 1B, in certain embodiments the recording and playback framework 1000 includes key management server 600. Key management server 600 grants and maintains packaging and playback licenses that specify how a particular recording or playback device, respectively, is to be used. To this end, key management server 600 includes a license generator 610 configured to generate a packaging license 622 (for example, in response to a request received from recording device 100) or a playback license 624 (for example, in response to a request received from playback device 200). License generator 610 includes instructions that, when executed by a processor, evaluate the authenticity and validity of a license request and, if appropriate, generate the requested license. In some cases evaluating the authenticity and validity of a license request may include evaluating an authorization token received with the license request, such as a recording authorization token 622a. Once generated, packaging license 622 and playback license 624 can be distributed to the requesting party. The generated license is also optionally stored in a license repository 620 that is maintained by key management server 600.

License generator 610 optionally incorporates license terms into the generated license, such as license terms 622t included in packaging license 622, and license terms 624t included in playback license. In some implementations license terms 622t, 624t are specified in the received license request, while in other implementations license terms 622t, 624t are specified by a third party, such as an administrator, who has access to key management server 600 and who has permission to define such terms. License generator 610 also incorporates a content key into the generated license, such as a content key 622k that is used to encrypt content (incorporated into packaging license 622), or a content key 624k that is used to decrypt content (incorporated into playback license 624).

Still referring to the example embodiment illustrated in FIGS. 1A and 1B, the networked content repository 700 provides a centralized repository for storing encrypted content items 710 which are generated by recording device 100, and which may be requested by playback device 200 for rendering. As illustrated, encrypted content item 710 may include, among other things, content 712, metadata 714 that defines certain aspects of content 712 (such as geolocation), a validation hash 716 (which itself may or may not be encrypted), and a packaging license 718. Other components, such as a digital signature, may be included in other embodiments. Because the content stored in content repository 700 is encrypted at recording device 100 and decrypted at playback device 200, content repository 700 may be connected to network 300 by an unsecure connection, thus allowing, for example, content to be transmitted to and from repository 700 via email or public Wi-Fi networks. This provides an additional degree of flexibility without compromising the security of the stored content.

The embodiments described herein can be implemented in various forms of hardware, software, firmware, or special purpose processors. For example, in one embodiment a non-transitory computer readable medium has instructions encoded thereon that, when executed by one or more processors, cause one or more of the secure multimedia content recording and playback techniques described herein to be implemented. The computer readable medium can be integrated into a digital camera or an electronic device including a digital camera, such as a body camera or a tablet computer. The instructions can be encoded using any suitable programming language, such as C, C++, object-oriented C, JavaScript, Visual Basic .NET, Scala, or alternatively, using custom or proprietary instruction sets. Such instructions can be provided in the form of one or more computer software applications and/or applets that are tangibly embodied on a memory device, and that can be executed by a computer having any suitable architecture. In one embodiment the system can be hosted on a given website and implemented, for example, using JavaScript or another suitable browser-based technology. In one implementation, the website is accessed using a browser installed on a smartphone that includes an integrated digital camera.

The functionalities disclosed herein can optionally be incorporated into a variety of different software applications, including mobile applications installed on a smartphone, tablet computer, laptop computer, compact digital camera, surveillance video camera, or other portable electronic device. The functionalities described herein can additionally or alternatively leverage services provided by, or be integrated into, other software applications, such as digital imaging applications, digital video editing applications, or content management systems. Thus, while certain of the embodiments disclosed herein are described in the context of securing recorded content to be used in a law enforcement context, in alternative implementations the techniques disclosed herein can be used to secure other audio, visual, or audiovisual assets in other applications. The computer software applications described herein may include any number of different modules, sub-modules, or other components of distinct functionality, and can provide information to, or receive information from, still other components and subcomponents. These modules can be used, for example, to communicate with input and/or output devices such as a display screen, a touch sensitive surface, a printer, or any other suitable input/output device. Other components and functionalities not reflected in the illustrations will be apparent in light of this disclosure, and it will be appreciated that the present disclosure is not intended to be limited to any particular hardware or software configuration. Thus in other embodiments the components illustrated in FIGS. 1A and 1B may include additional, fewer, or alternative subcomponents.

The aforementioned non-transitory computer readable medium may be any suitable medium for storing digital information, such as a hard drive, a server, a flash memory, and/or random access memory. In alternative embodiments, the components and modules disclosed herein can be implemented with hardware, including gate level logic such as a field-programmable gate array (FPGA), or alternatively, with a purpose-built semiconductor such as an application-specific integrated circuit (ASIC). Still other embodiments may be implemented with a microcontroller having input/output ports for receiving and outputting data, and embedded routines for carrying out the various functionalities disclosed herein. It will be apparent that any suitable combination of hardware, software, and firmware can be used, and that the present disclosure is not intended to be limited to any particular system architecture.

Methodology—Initialization

FIGS. 2A and 2B comprise a flowchart illustrating an example method 2000 for authorizing a particular recording device to generate an encrypted multimedia content item. As can be seen, method 2000 includes a number of phases and sub-processes, the sequence of which may vary from one embodiment to another. However, when considered in the aggregate, these phases and sub-processes form part of an improved secure recording authorization technique that is capable of authorizing a recording device to generate and encrypt a multimedia content item according to the terms of a packaging license. Method 2000 is responsive to user input, user-defined configuration settings, and detected conditions in accordance with certain of the embodiments disclosed herein. Method 2000 can be implemented, for example, using framework 1000 illustrated in FIGS. 1A and 1B and described herein, although other systems and components can be used in other embodiments, as will be apparent in light of this disclosure. To this end, the correlation of the various functionalities shown in FIGS. 2A and 2B to the specific components illustrated in FIGS. 1A and 1B is not intended to imply any structural or use limitations. Rather, other embodiments may include, for example, varying degrees of integration wherein multiple functionalities are effectively performed by one system, module, or component. For example, in an alternative embodiment a single computer system is used to authenticate a user and generate a packaging license. Thus other embodiments may have fewer or more systems, modules, or components depending on the granularity of implementation. Numerous variations and alternative configurations will be apparent in light of this disclosure.

As illustrated in FIG. 2A, method 2000 commences with recording device 100 sending a packaging license request 10 to key management server 600. See reference numeral 2110 in FIG. 2A. Such a request may be sent when a user of recording device 100 anticipates an upcoming need to generate recorded content. For example, in an implementation wherein recording device 100 comprises a body camera worn by a law enforcement officer, packaging license 622 may be requested when the officer activates his or her camera at the beginning of a shift. In one implementation, packaging license request 10 includes a user identifier and a recording device identifier, thus identifying the user and the device with which multimedia content is to be recorded. Packaging license request 10 optionally includes license terms specified by the requesting user, although in alternative embodiments such terms are omitted and instead defined by an administrator with access to license generator 610 executing on key management server 600.

Upon receipt of packaging license request 10, key management server 600 sends a recording authorization token request 20 to authorization server 500. See reference number 2120 in FIG. 2A. In one implementation recording authorization token request 20 includes the user identifier and recording device identifier that were originally received from recording device 100. Upon receipt of such request, authorization server 500 makes a determination with respect to whether the identified user is authorized to generate a new encrypted content item using the identified recording device 100. See reference numeral 2140 in FIG. 2A. Such a determination can be made on the basis of a listing of pre-established authorizations stored at authorization server 500. For example, in one implementation an administrator having access to authorization server 500 establishes such authorizations which, in turn, form the basis for making the aforementioned determination. If it is determined that the identified user is not authorized to generate a new encrypted content item using the identified recording device 100, an authorization failure notification is generated and distributed to key management server 600 and/or recording device 100. See reference numeral 2155 in FIG. 2A.

If, on the other hand, the identified user is authorized to generate a new encrypted content item using the identified recording device 100, authorization server 500 generates a recording authorization token. See reference numeral 2150 in FIG. 2A. The recording authorization token is registered in audit log 510. See reference numeral 2160 in FIG. 2A. The recording authorization token is also sent to key management server 600. See reference number 2210 in FIG. 2B. This indicates to key management server 600 that the user and device identified in the originally-received packaging license request 10 are authorized to receive the requested packaging license. In this way, authorization server 500 supports the functionality provided by key management server 600. Upon receiving the recording authorization token, key management server 600 generates a content key that is to be used in the encryption of content captured by recording device 100. See reference number 2220 in FIG. 2B. The content key can therefore be specific to the user and/or the recording device 100 as specified in the authorization token received from authorization server 500. The content key may also be specific to other elements, such as a specified storage domain to which encrypted content must be sent, or a specified time window during which the content key remains valid.

Key management server 600 also optionally generates license terms that govern how recording device 100 may be used to capture multimedia content. More specifically, the license terms may specify a wide range of conditions which must be satisfied before the content key can be used to encrypt content captured by recording device 100. Examples of such conditions include temporal conditions (for example, as expressed in terms of a license expiration date or time), geographic conditions (for example, as expressed in terms of a geographic region within which content may be captured), and/or security conditions (for example, as expressed in terms of a secondary credential, such as an identification card, which must be present before content may be captured). Any number of a wide range of different conditions may be defined in the license terms that key management server 600 generates. In one implementation, the license terms are defined by an administrator having access to key management server 600. Vesting authority to define and maintain license terms in a single entity, such as key management server 600, helps to implement a uniform licensing scheme that can be overseen by an established administration team. However, it will be appreciated that establishing license terms for content capture is optional, and in implementations wherein the authorized user is free to record encrypted content with the identified device as he or she wishes, no license terms are defined.

Key management server 600 bundles the content key, the recording authorization token received from authorization server 500, and the license terms (if any) into a packaging license. See reference numeral 2230 in FIG. 2B. The authorization token is optionally encrypted with a separate escrow key. The resulting packaging license is stored in license repository 620, which is hosted by key management server 600. See reference numeral 2240 in FIG. 2B. The resulting packaging license is also delivered to recording device 100. See reference numeral 2250 in FIG. 2B. A content recording policy, as defined by the aforementioned license terms, is therefore defined at the time the license is issued to recording device 100. Additional details with respect to the capture and encryption of content at recording device 100 based on the permission granted by packaging license will be described in turn.

Methodology—Secure Recording

FIGS. 3A and 3B comprise a flowchart illustrating an example method 3000 for securely recording an encrypted multimedia content item based on a previously-received authorization, such as the packaging license described above with respect to FIGS. 2A and 2B. As can be seen, method 3000 includes a number of phases and sub-processes, the sequence of which may vary from one embodiment to another. However, when considered in the aggregate, these phases and sub-processes form part of an improved secure recording technique that is capable of generating encrypted multimedia content at a recording device in accordance with the terms of a packaging license. Method 3000 is responsive to user input, user-defined configuration settings, and detected conditions in accordance with certain of the embodiments disclosed herein. Method 3000 can be implemented, for example, using framework 1000 illustrated in FIGS. 1A and 1B and described herein, although other systems and components can be used in other embodiments, as will be apparent in light of this disclosure. To this end, the correlation of the various functionalities shown in FIGS. 3A and 3B to the specific components illustrated in FIGS. 1A and 1B is not intended to imply any structural or use limitations. Rather, other embodiments may include, for example, varying degrees of integration wherein multiple functionalities are effectively performed by one system, module, or component. For example, in an alternative embodiment a single component is used to manage a received packaging license and encrypt captured content. Thus other embodiments may have fewer or more systems, modules, or components depending on the granularity of implementation. Numerous variations and alternative configurations will be apparent in light of this disclosure.

As illustrated in FIG. 3A, method 3000 commences with communication module 140 of recording device 100 receiving a packaging license from key management server 600. See reference numeral 3110 in FIG. 3A. Packaging license may be generated, for example, using method 2000 disclosed herein. In some cases the packaging license is received at recording device 100 shortly after it is generated by key management server 600. In other cases recording device 100 requests and receives the packaging license only when a recording operation is about to commence, in which case the packaging license may have been created long before it is actually delivered to recording device 100. Upon receipt of the packaging license, packaging license manager 170 makes a determination with respect to whether the received packaging license is valid. See reference numeral 3120 in FIG. 3A. For example, in many cases the packaging license will specify a validity period or expiration date. The packaging license may additionally or alternatively specify one or more users who are authorized to record multimedia content. In this case, a fingerprint sensor that forms part of recording device 100 can be used to scan a fingerprint of a user operating recording device, which can be used to determine whether the terms of the packaging license are satisfied. A wide range of other biometric identification techniques can be used in other implementations, including voiceprint recognition, iris recognition, and facial recognition techniques. If it is determined that the license has expired or is otherwise invalid, packaging license manager 170 generates a license validation failure notification. See reference number 3125 in FIG. 3A.

If the packaging license is determined to be valid, recording device 100 is understood as being authorized to record and encrypt multimedia content. In this case, multimedia input adapter 160 captures multimedia content received via, for example, a digital camera and/or a microphone. See reference numeral 3140 in FIG. 3A. In some cases metadata is generated in association with the captured multimedia content. See reference numeral 3150 in FIG. 3A. The generated metadata can be used to define certain aspects of the captured content, such as a geolocation, a date or timestamp, a user identifier, a subject identifier, network connection status, a zoom level, an audio amplification level, and the like. The generated metadata can also be used to provide information about recording device 100, such as a make, model, and/or serial number. Once content has been captured, packaging license manager 170 enforces the license terms included in the packaging license, if any. See reference numeral 3160 in FIG. 3A. This provides an administrator with a degree of control over the content capture process, thus facilitating implementation of uniform packaging policies across a large number of recording devices. As noted above, the license terms may impose conditions on the captured content, examples of which include, but are not limited to temporal conditions (for example, as expressed in terms of a license expiration date or time), geographic conditions (for example, as expressed in terms of a geographic region within which content may be captured, security conditions (for example, as expressed in terms of a secondary credential, such as an identification card, which must be present before content may be captured). In some cases the collected metadata is used in determining whether a particular condition is satisfied.

Once it is determined that any conditions imposed by the license terms have been satisfied, encryption module 180 encrypts the captured multimedia content and associated metadata using the content key included in (and extracted from) the packaging license that was received from key management server 600. See reference numeral 3210 in FIG. 3B. In certain implementations the content key is extracted from the packaging license using a device identifier associated with recording device 100. As noted above, any of a variety of suitable encryption techniques can be used to encrypt the captured content, including AES-CTR and AES-GCM authenticated encryption. In such implementations a separate key, such as a digital signature, is used to provide authentication, in which case the packaging license will include two separate keys. Encryption module 180 optionally generates a validation hash for the captured content. See reference numeral 3220 in FIG. 3B. In some implementations only the recorded content is hashed, while in other cases both the recorded content and the generated metadata is hashed. A validation hash is useful to detect tampering with, and provide authenticity and integrity assurances for, the recorded content, the generated metadata, the packaging license, or any other digital objects used during the content recording process. The validation hash may or may not be encrypted. In addition, both encrypted and unencrypted data may be hashed.

In principle, the foregoing process of capturing multimedia content, generating metadata, enforcing license terms, encrypting the captured content, and optionally generating a validation hash can be invoked continually as long as a recording operation continues. As a practical matter, a license term that establishes a maximum recording time may force the recording to end at a certain point. In any event, at some point it will be determined that, for whatever reason, the capture operation is complete. See reference numeral 3230 in FIG. 3B. In response to such a determination, multimedia input adapter 160 bundles the captured content, the generated metadata, the validation hash, and the packaging license into an encrypted content item. See reference numeral 3240 in FIG. 3B. A digital signature associated with the user of recording device is also optionally included in the encrypted content item. Communication module 140 of recording device 100 transmits this encrypted content item to content repository 700. See reference numeral 3250 in FIG. 3B. Thus multimedia content generated by recording device 100 using framework 1000 is encrypted before being transmitted from recording device 100. Because the content item is encrypted, such transmission need not occur over secure channels. Indeed, encrypting the captured multimedia content at recording device 100 avoids recording or transmitting unencrypted data, thus securing the authenticity and integrity of the recorded content. As illustrated in FIG. 1B, content 712, metadata 714, validation hash 716, and packaging license 718 are stored together in a bundled encrypted content item 710 in content repository 700.

Methodology—Secure Playback

FIGS. 4A through 4C comprise a flowchart illustrating an example method 4000 for secure playback of an encrypted multimedia content item, such as may be generated using the secure recording method described herein with respect to FIGS. 3A and 3B. As can be seen, method 4000 includes a number of phases and sub-processes, the sequence of which may vary from one embodiment to another. However, when considered in the aggregate, these phases and sub-processes form part of an improved secure playback technique that is capable of rendering encrypted multimedia content at a playback device in accordance with the terms of a playback license. Method 4000 is responsive to user input, user-defined configuration settings, and detected conditions in accordance with certain of the embodiments disclosed herein. Method 4000 can be implemented, for example, using framework 1000 illustrated in FIGS. 1A and 1B and described herein, although other systems and components can be used in other embodiments, as will be apparent in light of this disclosure. To this end, the correlation of the various functionalities shown in FIGS. 4A through 4C to the specific components illustrated in FIGS. 1A and 1B is not intended to imply any structural or use limitations. Rather, other embodiments may include, for example, varying degrees of integration wherein multiple functionalities are effectively performed by one system, module, or component. For example, in an alternative embodiment a single component is used to manage a received playback license and decrypt received multimedia content. Thus other embodiments may have fewer or more systems, modules, or components depending on the granularity of implementation. Numerous variations and alternative configurations will be apparent in light of this disclosure.

As illustrated in FIG. 4A, method 4000 commences with playback device 200 sending a playback authorization token request 50 to authorization server 500. See reference numeral 4110 in FIG. 4A. Playback authorization token request 50 may be generated, for example, in response to a user command to render encrypted content, such as may be received from content repository 700. The encrypted content may be obtained from content repository 700 before or after the playback authorization token request 50 is generated. In one embodiment, playback authorization token request 50 includes a user identifier and a content item identifier corresponding to the content item which is sought to be rendered. In response to receiving playback authorization token request 50, authorization server 500 determines whether the user identified by the user identifier is authorized to render the identified content. See reference numeral 4120 in FIG. 4A. Such a determination can be made on the basis of a listing of pre-established authorizations stored at authorization server 500. For example, in one implementation an administrator having access to authorization server 500 establishes such authorizations which, in turn, form the basis for making the aforementioned determination. If it is determined that the identified user is not authorized to render the identified content item, an authorization failure notification is generated and distributed to playback device 200. See reference number 4145 in FIG. 4A.

If, on the other hand, the identified user is authorized to render the identified content item, authorization server 500 generates a playback authorization token. See reference numeral 4140 in FIG. 4A. The playback authorization token is registered in audit log 510. See reference numeral 4150 in FIG. 4A. The playback authorization token is sent to playback device 200. See reference numeral 4160 in FIG. 4A. Authorization server 500 thus provides playback device 200 with a playback authorization token that indicates that playback device 200 is authorized to render multimedia content acquired from content repository 700. Playback device 200 bundles the playback authorization token with a playback device identifier into a playback license request 60. Playback license request 60 is sent to key management server 600. See reference numeral 4210 in FIG. 4B. This indicates to key management server that the identified user is authorized to render the identified content item. Playback license request 60 represents a request to grant a license to render the identified content item on the identified playback device. Such a license may be granted on the basis of the received playback authorization token.

Upon receiving playback license request 60, key management server 600 retrieves a content key that is capable of decrypting the identified content item. In general, such a content key will be available in license repository 620. More specifically, the packaging license that authorized the encryption of the content item will include a content key capable of decrypting the same content (see reference numerals 2230 and 2240 in FIG. 2B). The content key is optionally modified to be specific to the user who is authorized to render the encrypted content item, playback device 200 which will be used to render the encrypted content item, or any other elements, including elements specified in the playback authorization token received from authorization server 500.

Key management server 600 also optionally generates license terms that govern how playback device 200 may be used to render the content item. The license terms may specify a wide range of conditions which must be satisfied before the content key can be used for decryption. Examples of such conditions include temporal conditions (for example, as expressed in terms of a license expiration date or time), geographic conditions (for example, as expressed in terms of a geographic region within which the content item may be rendered), and/or security conditions (for example, as expressed in terms of a secondary credential, such as an identification card, which must be present before the content item is rendered. Any of a wide range of different conditions may be defined in the license terms that key management server 600 generates. In one implementation, the license terms are defined by an administrator having access to key management server 600. Vesting authority to define and maintain license terms in a single entity, such as key management server 600, helps to implement a uniform licensing scheme that can be overseen by an established administration team. However, it will be appreciated that establishing license terms for content playback is optional, and in implementations wherein the authorized user is free to render an encrypted content item with the identified device as he or she wishes, no license terms are defined.

Key management server 600 bundles the content key and the license terms (if any) into a playback license. In some implementations, the playback authorization token received from authorization server 500 is also bundled into the playback license, in which case the authorization token is optionally encrypted with a separate escrow key. The resulting playback license is stored in license repository 620, which is hosted by key management server 600. The playback license, which is specific to a particular content item, is issued to playback device 200. See reference number 4220 in FIG. 4B. A content playback policy, as defined by the aforementioned license terms, is therefore defined at the time the playback license issues to playback device 200.

Upon receipt of the playback license, playback license manager 270 makes a determination with respect to whether the received playback license is valid. See reference numeral 4230 in FIG. 4B. For example, in many cases the playback license will specify a validity period or expiration date. If it is determined that the license has expired or is otherwise invalid, playback license manager 270 makes a determination with respect to whether to attempt to acquire a new license from key management server 600. See reference numeral 4235. A new license may be requested when the validity period associated with a first license has expired, for example. If no further attempt to acquire a license is made, or if an updated license is unavailable, playback license manager 270 generates a license validation failure notification. See reference numeral 4238 in FIG. 4B.

On the other hand, if the playback license is determined to be valid, playback device 200 is understood as being authorized to decrypt and render the content item identified in the license. In this case, playback license manager 270 enforces the license terms included in the playback license, if any. See reference numeral 4240 in FIG. 4B. This provides an administrator with a degree of control over the content playback process, thus facilitating implementation of uniform playback policies across a large number of playback devices. It also facilitates destruction of content items after an expiry period, for example by cancelling all outstanding playback licenses.

Once it is determined that any conditions imposed by the license terms have been satisfied, decryption module 280 decrypts the content item (and associated metadata, if any) using the content key included in (and extracted from) the playback license that was received from key management server 600. See reference numeral 4250 in FIG. 4B. In certain implementations the content key is extracted from the playback license using a device identifier associated with playback device 200. Where the content item is encrypted using authenticated encryption, a separate key, such as a digital signature, is used to provide authentication, in which case the playback license will include two separate keys.

Decryption module 280 optionally decodes and verifies the integrity of the decrypted content item, for example on the basis of a hash of encrypted and/or unencrypted data forming the content item. See reference numeral 4310 in FIG. 4C. A validation hash is useful to detect tampering with the content item and associated metadata. In addition, where the content item includes metadata that was also hashed, verifying the validation hash also provides assurances that the content originated at a specific device, was recorded at a specific time, or is otherwise accurately characterized by the metadata. This is particularly useful in applications where it is important to establish that the metadata has not been tampered with, such as in a law enforcement context where the circumstances around which the multimedia content was generated must be reliably established. It also provides additional information which may not be immediately evident from a single playback operation. For example, if 14 seconds a multimedia content item is rendered beginning at an arbitrary time, the validated hash of the metadata will indicate that video exists before the time at which playback began. Once decryption and validation are complete, multimedia output adapter 260 renders the decrypted content, for example by displaying a video using a display screen, or playing an audio track using a speaker. See reference numeral 4320 in FIG. 4C. In such implementations, because playback invokes user authorization services (provided by authorization server 500) and content decryption services (licensed by key management server 600), method 4000 can be used to ensure that only authorized playback devices are able to view decrypted content.

In principle, the foregoing process of enforcing license terms, decrypting and validating content, and rendering content can be invoked continually as long as the rendered content remains available. As a practical matter, a license term that establishes a maximum playback time or playback count may force the playback to end at a certain point. In any event, at some point it will be determined that, for whatever reason, the playback operation is complete. See reference numeral 4330 in FIG. 4C. In response to such a determination, playback license manager 270 notifies authorization server 500 that the playback license is released. See reference numeral 4340 in FIG. 4C. Authorization server 500 optionally records the release of the playback license in audit log 510, thus providing a record of the point at which playback device 200 was no longer authorized to playback the identified content item. See reference numeral 4350 in FIG. 4C.

Further Example Embodiments

Numerous variations and configurations will be apparent in light of this disclosure. For instance, one example embodiment provides a computer-implemented packaging license administration method. The method comprises receiving, at a key management server from a recording device, a packaging license request that includes a user identifier and a recording device identifier. The method further comprises sending, from the key management server to an authorization server, a recording authorization token request that includes the user identifier and the recording device identifier. The method further comprises receiving, at the key management server from the authorization server, a recording authorization token. The method further comprises generating a content key that is capable of encrypting multimedia content. The method further comprises defining a license term that restricts operability of the content key unless a specified condition is satisfied. The method further comprises bundling the content key, the license term, and the recording authorization token into a packaging license. The method further comprises sending the packaging license to the recording device. In some cases the authorization token indicates that a user identified by the user identifier is authorized to encrypt multimedia content captured using the recording device. In some cases (a) the specified condition is a requirement that a secondary credential be present for the content key to be operable; and (b) the secondary credential is an identification card that is readable by the recording device. In some cases the content key is encrypted based on the recording device identifier. In some cases the license term is selected based on a pre-established permission that is associated with the user identifier and the recording device identifier, and that is stored at the key management server. In some cases the method further comprises storing the packaging license in a packaging license repository hosted by the key management server. In some cases the license term includes an expiration timestamp after which the content key is inoperable to encrypt multimedia content. In some cases the content key is encrypted based on the user identifier.

Another example embodiment provides a non-transitory computer readable medium encoded with instructions that, when executed by one or more processors, cause a secure content recording process to be invoked. The process comprises receiving, at a recording device from a key management server, a packaging license. The process further comprises extracting a content key from the packaging license. The content key is capable of encrypting multimedia content. The process further comprises extracting a plurality of licensing terms from the packaging license. A first one of the licensing terms defines a license validity period, and a second one of the licensing terms restricts operability of the content key unless a specified condition is satisfied. The process further comprises making a first determination that the packaging license is valid. The process further comprises capturing multimedia content. The process further comprises making a second determination that the specified condition is satisfied. The process further comprises using the content key to encrypt the multimedia content. The process further comprises electronically transmitting the encrypted multimedia content from the recording device to a content repository. In some cases the secure content recording process further comprises (a) generating a validation hash of the captured multimedia content; and (b) bundling the validation hash with the encrypted multimedia content to form an encrypted content item, wherein electronically transmitting the encrypted multimedia content to the content repository comprises electronically transmitting the encrypted content item to the content repository. In some cases the secure content recording process further comprises generating metadata that defines a geolocation representative of where the multimedia content was captured. In some cases the content key and a digital signature associated with a user of the recording device are used to encrypt the multimedia content using an authenticated encryption technique. In some cases the encrypted multimedia content is electronically transmitted to the content repository in response to determining that the license validity period has expired. In some cases the secure content recording process further comprises (a) extracting a recording authorization token from the packaging license; and (b) bundling the recording authorization token with the encrypted multimedia content to form an encrypted content item, wherein electronically transmitting the encrypted multimedia content to the content repository comprises electronically transmitting the encrypted content item to the content repository. In some cases the secure content recording process further comprises (a) generating metadata that defines a characteristic of the recording device; and (b) bundling the generated metadata with the encrypted multimedia content to form an encrypted content item, wherein electronically transmitting the encrypted multimedia content to the content repository comprises electronically transmitting the encrypted content item to the content repository. In some cases (a) the content key is encrypted; and (b) the process further comprises decrypting the content key using a device identifier associated with the recording device. In some cases making the first determination that the packaging license is valid further comprises determining whether the license validity period has expired. In some cases the captured multimedia content is not transmitted from the recording device before it is encrypted using the content key.

Another example embodiment provides a content playback device that comprises a display screen. The content playback device further comprises a memory device. The content playback device further comprises a processor that is operatively coupled to the display screen and the memory device. The processor is configured to execute instructions stored in the memory device that, when executed, cause the processor to invoke a secure content playback process. The process comprises receiving, from a content repository, an encrypted content item that is identified by a content item identifier. The process further comprises sending, to an authorization server, a playback authorization token request that includes a user identifier and the content item identifier. The process further comprises receiving, from the authorization server, a playback authorization token. The process further comprises sending, to a key management server, a playback license request that includes the playback authorization token and a playback device identifier. The process further comprises receiving, from the key management server, a playback license that includes a content key. The process further comprises decrypting the content item using the content key. The process further comprises rendering the content item on the display screen. In some cases (a) the content key is encrypted; and (b) the process further comprises decrypting the content key using the playback device identifier.

The foregoing disclosure has been presented for the purposes of illustration and description. It is not intended to be exhaustive or to be limited to the particular described embodiments. Many modifications and variations are possible. It is therefore intended that the scope of the invention be limited not by this detailed description, but rather by the claims appended hereto.

What is claimed is:

1. A computer-implemented packaging license administration method comprising:
   receiving, at a key management server from a recording device, a packaging license request that includes a user identifier and a recording device identifier;
   sending, from the key management server to an authorization server, a recording authorization token request that includes the user identifier and the recording device identifier;
   receiving, at the key management server from the authorization server, a recording authorization token that indicates that a user identified by the user identifier is authorized to encrypt multimedia content captured using the recording device;
   generating a content key that is capable of encrypting multimedia content;
   defining a license term that restricts operability of the content key unless a specified condition is satisfied, wherein the specified condition is a requirement that a secondary credential be present for the content key to be operable, and wherein the secondary credential is an identification card that is readable by the recording device;
   bundling the content key, the license term, and the recording authorization token into a packaging license; and
   sending the packaging license to the recording device.

2. The computer-implemented method of claim 1, wherein the content key is encrypted based on the recording device identifier.

3. The computer-implemented method of claim 1, wherein the license term is selected based on a pre-established permission that is associated with the user identifier and the recording device identifier, and that is stored at the key management server.

4. The computer-implemented method of claim 1, further comprising storing the packaging license in a packaging license repository hosted by the key management server.

5. The computer-implemented method of claim 1, wherein the license term includes an expiration timestamp after which the content key is inoperable to encrypt multimedia content.

6. The computer-implemented method of claim 1, wherein the content key is encrypted based on the user identifier.

7. A non-transitory computer readable medium having instructions encoded thereon that, when executed by one or more processors, cause a secure content recording process to be invoked, the process comprising:
   receiving, at a recording device from a key management server, a packaging license;
   extracting a content key from the packaging license, wherein the content key is capable of encrypting multimedia content;
   extracting a plurality of licensing terms from the packaging license, wherein a first one of the licensing terms defines a license validity period, wherein a second one of the licensing terms restricts operability of the content key unless a specified condition is satisfied, and wherein the specified condition is that a particular user is operating the recording device;
   making a first determination that the packaging license is valid;
   capturing multimedia content;
   making a second determination that the specified condition is satisfied, wherein making the second determination comprises determining that the particular user is operating the recording device based on a fingerprint scanned by the recording device;
   using the content key to encrypt the multimedia content; and
   electronically transmitting the encrypted multimedia content from the recording device to a content repository.

8. The non-transitory computer readable medium of claim 7, wherein the secure content recording process further comprises:
   generating a validation hash of the captured multimedia content; and
   bundling the validation hash with the encrypted multimedia content to form an encrypted content item, wherein electronically transmitting the encrypted multimedia content to the content repository comprises electronically transmitting the encrypted content item to the content repository.

9. The non-transitory computer readable medium of claim 7, wherein the content key and a digital signature associated with the particular user are used to encrypt the multimedia content using an authenticated encryption technique.

10. The non-transitory computer readable medium of claim 7, wherein the encrypted multimedia content is electronically transmitted to the content repository in response to determining that the license validity period has expired.

11. The non-transitory computer readable medium of claim 7, wherein the secure content recording process further comprises:
    extracting a recording authorization token from the packaging license; and
    bundling the recording authorization token with the encrypted multimedia content to form an encrypted content item, wherein electronically transmitting the encrypted multimedia content to the content repository comprises electronically transmitting the encrypted content item to the content repository.

12. The non-transitory computer readable medium of claim 7, wherein the secure content recording process further comprises:
    generating metadata that defines a characteristic of the recording device; and
    bundling the generated metadata with the encrypted multimedia content to form an encrypted content item, wherein electronically transmitting the encrypted multimedia content to the content repository comprises electronically transmitting the encrypted content item to the content repository.

13. The non-transitory computer readable medium of claim 7, wherein:
    the content key is encrypted; and
    the process further comprises decrypting the content key using a device identifier associated with the recording device.

14. The non-transitory computer readable medium of claim 7, wherein making the first determination that the packaging license is valid further comprises determining whether the license validity period has expired.

15. The non-transitory computer readable medium of claim 7, wherein the captured multimedia content is not transmitted from the recording device before it is encrypted using the content key.

* * * * *